May 13, 1969 C. B. BLAIR 3,443,708
BALE ACCUMULATOR FOR SPECIAL FIELD CONDITIONS
Filed Feb. 6, 1967 Sheet 1 of 4

INVENTOR.
CALVIN B. BLAIR
BY
Fishburn and Gold
ATTORNEYS

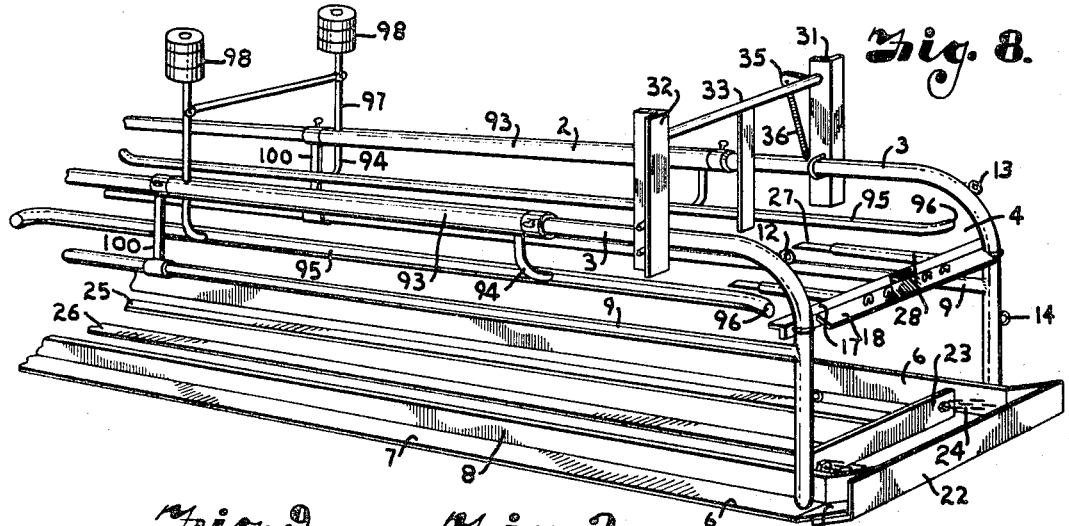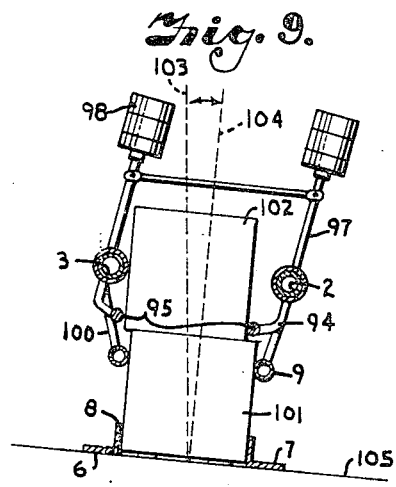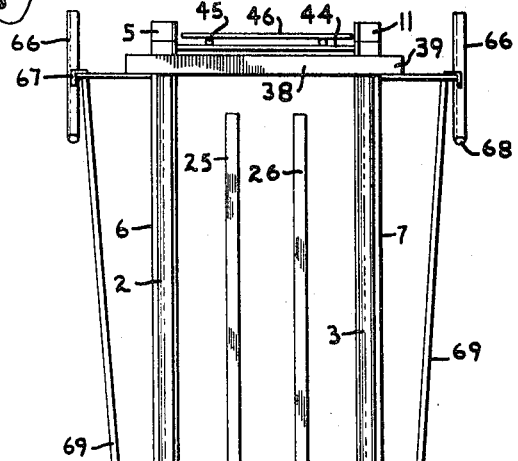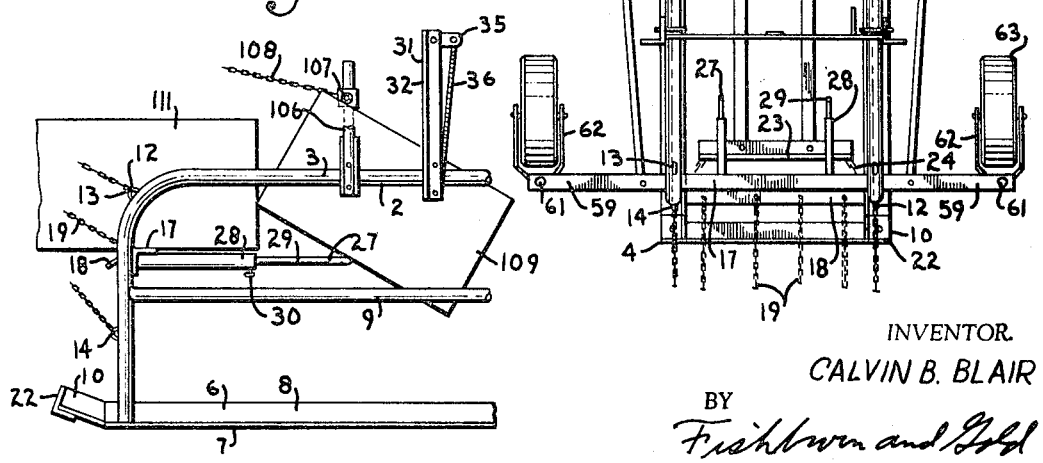

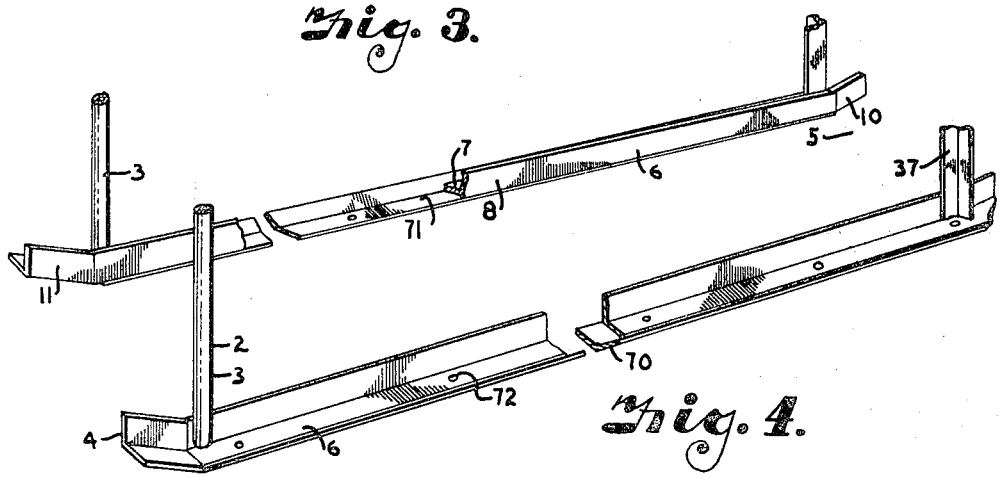
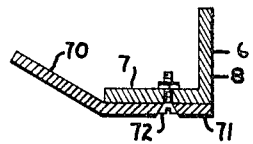
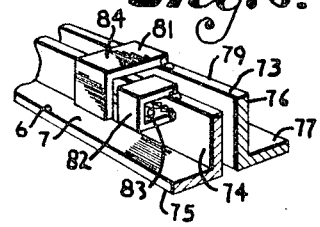
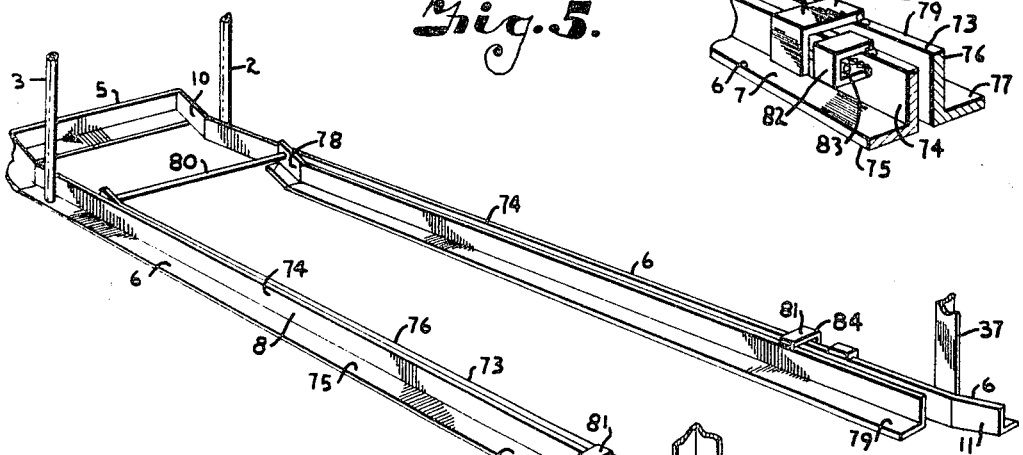
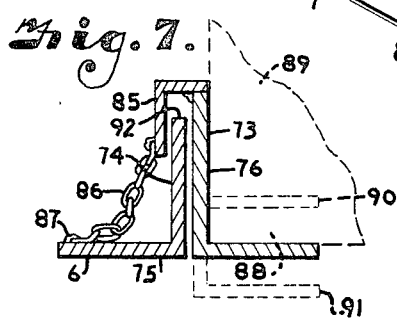
INVENTOR.
CALVIN B. BLAIR
BY Fishburn and Gold
ATTORNEYS

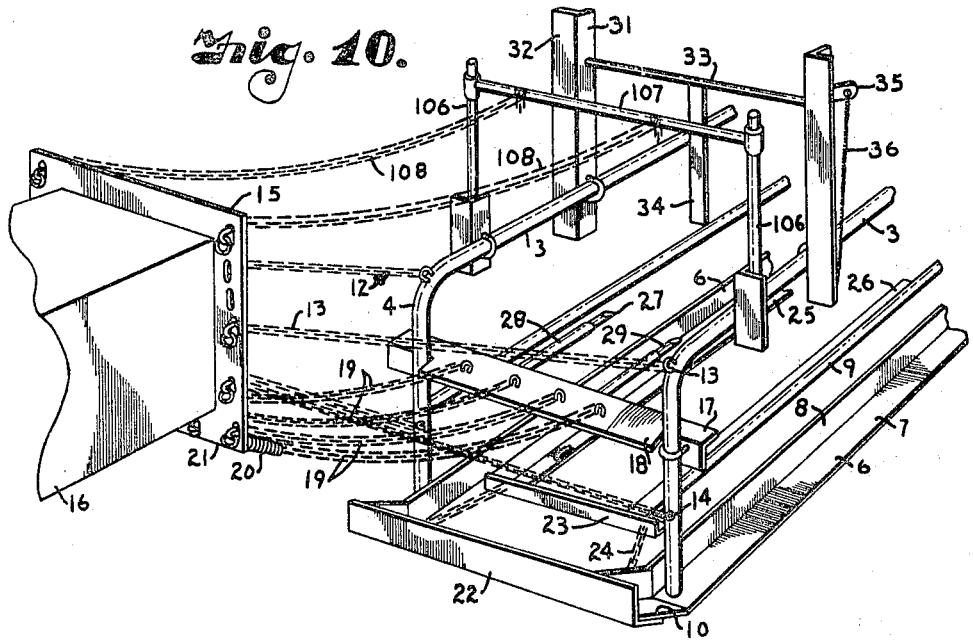
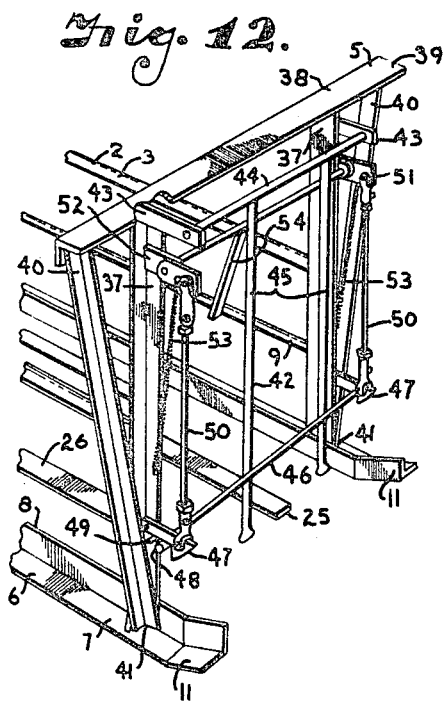
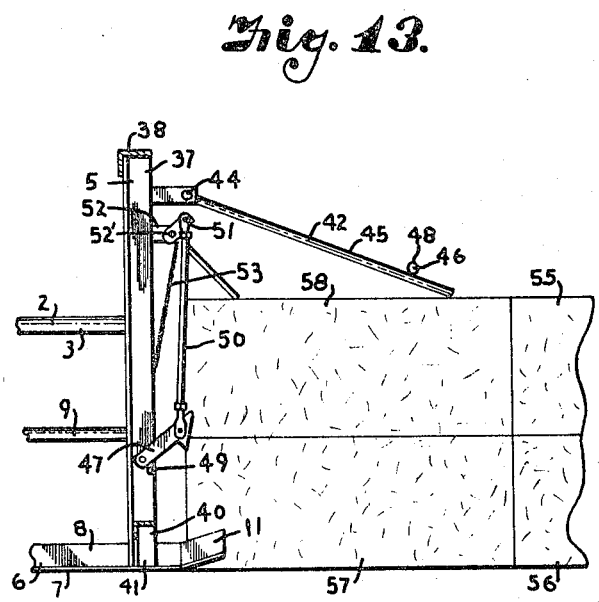
INVENTOR.
CALVIN B. BLAIR
BY
Fishburn and Gold
ATTORNEYS

United States Patent Office 3,443,708
Patented May 13, 1969

3,443,708
BALE ACCUMULATOR FOR SPECIAL FIELD CONDITIONS
Calvin B. Blair, Barnard, Kans., assignor to United Manufacturers, Inc., Barnard, Kans., a corporation of Kansas
Continuation-in-part of application Ser. No. 447,379, Apr. 12, 1965. This application Feb. 6, 1967, Ser. No. 614,368
Int. Cl. B60p 1/00; B65g 57/20; A01d 75/04
U.S. Cl. 214—353    12 Claims

ABSTRACT OF THE DISCLOSURE

A rear delivery baler drawn bale accumulator and stacker is modified in structure so as to function properly when encountering special field conditions such as steep slopes, excesively rough ground, irrigation rills and wide ditches. The modifications include laterally projecting frame supporting members including wheels and runners, upwardly and outwardly directed lips extending along accumulator frame skids, bale supporting members in the form of elongated angles adjacent and between the skids, structure for displacing a bale laterally with respect to a bale therebeneath so that the discharged stack is stable though resting on a slope, and flexible hitch means including upper retainer chains and a cross-bar for resisting premature bale drop due to rough ground.

Cross references to related applications

This invention relates to modifications of a basic bale stacker such as that disclosed by Thor Leif C. Solem et al. in U.S. Patent No. 2,971,318, issued Feb. 14, 1961. This invention also is a continuation-in-part of, and contemplates further modifications and improvements in, the baler drawn bale accumulator and stacker disclosed in my co-pending application, Ser. No. 447,379, filed Apr. 12, 1965, now Patent No. 3,302,807.

Background of the invention

This invention relates to bale accumulators adapted to be drawn by a mobile rear delivery baler and which receives bales delivered by the baler, accumulates a predetermined number of the bales, and deposits same upon the ground in a conveniently stacked group. This is desirable so that a subsequent pickup device can simultaneously grasp the entire group for efficient transport to a place of storage. Although existing bale accumulators of general type disclosed in the above patents have proved to be highly desirably under normally encountered field conditions, difficulties are presented when the field is steeply sloped, excessively rough, contains irrigation rills, or presents wide ditches over which the accumulator must be drawn.

Summary of the invention

To avoid difficulties in the proper accumulation and deposit of bales when encountering special field conditions, modifications are made in the accumulator which include laterally extending secondary support structure adapted to contact the ground at positions displaced from the accumulator skids, angularly upwardly directed lips rigid with the skids, bale edge supporting members associated with the skids, to prevent bale dropout, structure for displacing an upper bale laterally with respect to a lower bale so as to present a stable stack on sloped ground and retaining structure associated with the hitch for retarding early bale drop which may be induced by travel over excessively rough ground.

Brief description of the drawings

FIG. 2 is a plan view of the structure shown in FIG. 1 on a reduced scale.

FIG. 3 is a fragmentary perspective view of another embodiment of this invention showing accumulator skids with upwardly and outwardly directed rigid lips thereon.

FIG. 4 is a fragmentary cross sectional view on an enlarged scale, through one of the modified skids of FIG. 3.

FIG. 5 is a fragmentary perspective view showing a further modified form of this invention having bale edge supporting inner angles associated the accumulator skids.

FIG. 6 is a fragmentary perspective view on an enlarged scale showing flexible retaining structure cooperating between a skid and inner angle of the modification shown in FIG. 5.

FIG. 7 is a fragmentary cross sectional view through a skid showing a further modified form of retaining structure between the skid and an inner angle.

FIG. 8 is a fragmentary perspective view of a further modified form of this invention equipped with structure for displacing the upper bales with respect to the lower bales for producing stabilized bale stacks on slopes.

FIG. 9 is a fragmentary cross sectional view through the accumulator of FIG. 8 showing the displacing structure engaging bales within the accumulator.

FIG. 10 is a fragmentary perspective view of a further modified accumulator showing bale retarding structure mounted theron and communicating by chains to the baler.

FIG. 11 is a fragmentary side elevation showing the structure of FIG. 10 with bales therein, one of the bales engaging the retarding structure.

FIG. 12 is a fragmentary perspective view showing a typical rear gate useful on the accumulators of this invention.

FIG. 13 is a fragmentary side elevation showing the gate of FIG. 12 in tripped condition with a stack of bales passing therethrough.

Description of the preferred embodiments

Figure 1:
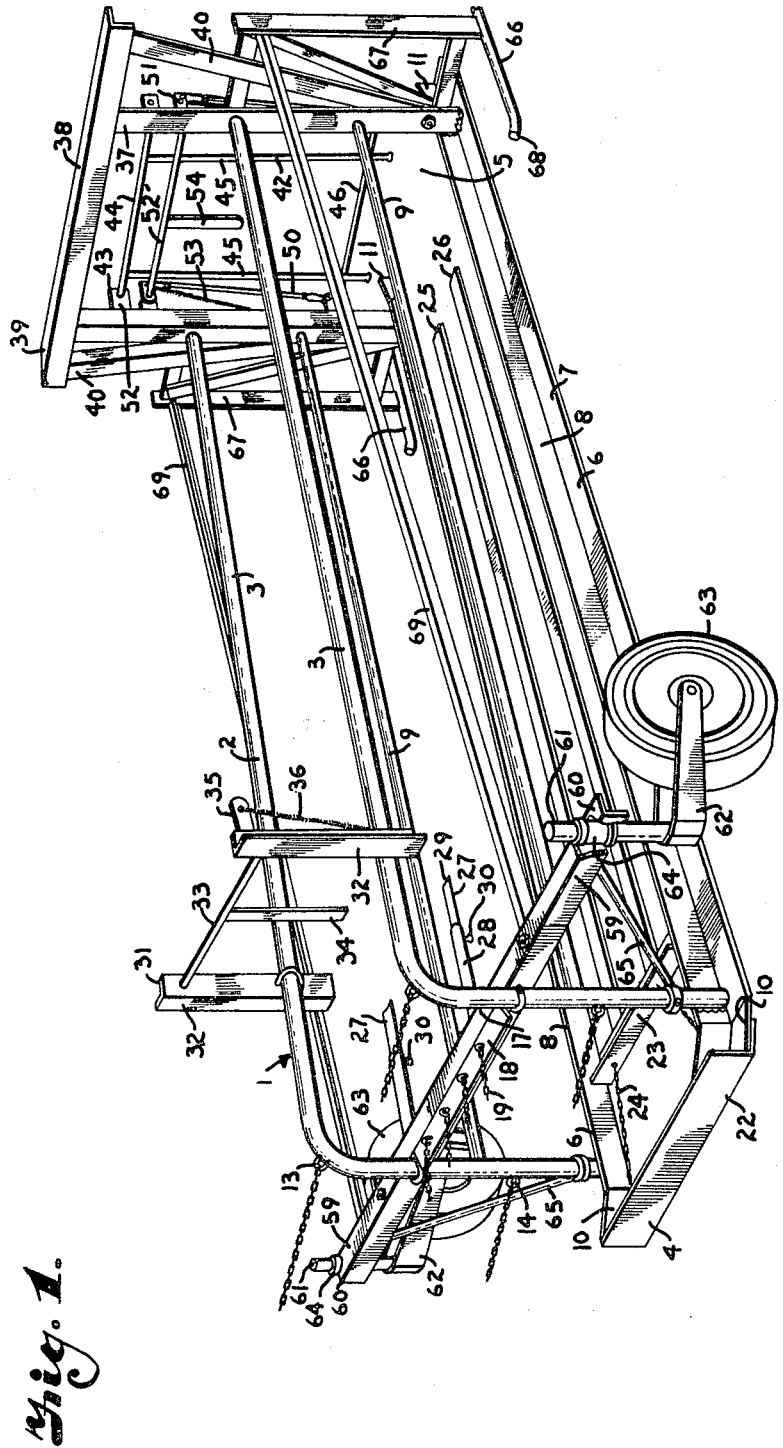
FIG. 1 is a perspective view of a four-bale, skid supported, accumulator having laterally extending, secondary, front and rear supporting structure embodying this invention.

The reference numeral 1 (FIG. 1) generally indicates a bale accumulator and stacker embodying this invention. The accumulator 1 comprises a frame 2 having upper elongated structural members 3 extending horizontally and parallel to each other in spaced apart relation between the front 4 and rear 5 of the accumulator. The structural members 3 are spaced apart a distance sufficient to loosely accommodate the width of a hay bale therebetween and extend downwardly at the front 4 terminating at ground level in fixed engagement with spaced apart skids 6. The skids 6 are composed of elongated angles having one leg 7 in running contact with the ground and the other leg 8 rising vertically on the inside of the frame 2 substantially in the vertical planes containing the respective structural members 3. An intermediate bar 9 extends horizontally parallel to and between each skid 6 and the respective structural member 3 forming a fence or side retainer for bales contained within the frame 2. Forward and rear extensions 10 and 11 are secured to the skids 6 and angle upwardly therefrom. The extensions 10 aid in causing the accumulator to rise over obstructions in the field when pulled forwardly during normal operation. The rear extensions 11 help guide the stacked bales emerging from the structure.

A flexible chain hitch 12 is comprised of upper and lower side chains 13 and 14 secured in vertically spaced apart relation to the forward portion of the structural members 3 so as to form flexible side members which are taut when the accumulator is being pulled forwardly in a straight line. The chains 13 and 14 normally slope upwardly from the forward portion of the structural members 3 and are secured in vertically spaced apart relation to the rear face 15 (FIG. 10) of the chute 16 of a rear discharge field baler. The respective chains 13 and 14 are laterally spaced apart a distance whereby a bale ejected from the chute 16 is loosely retained against lateral motion but may easily move rearwardly toward the frame 2.

An elongated angle 17 (FIG. 10) extends transversely between and is secured to the structural members 3 vertically intermediate the horizontal portion of the members 3 and the bars 9. The angle 17 has a lip 18 extending forwardly and downwardly therefrom. Four bottom chains 19 (FIG. 10) are respectively secured at the rear ends thereof in horizontally spaced apart relation to the angle 17 between the structural members 3 and extend forwardly and upwardly in relatively parallel association. The forward ends of the chains 19 are secured to respective helical tension springs 20 which are in turn secured to the bottom 21 of the rear face 15. The lip 18 extends forwardly and downwardly beneath the connections of the chains 19 and thus forms a guide for urging the leading lower transverse edge of a bale upwardly over the angle 17 for entrance into the accumulator.

A front bumper member 22 adds rigidity to the front of the frame 2. A transverse angle 23 of substantially shorter length than the distance between the structural members 3 is located generally between the skids 6 near the front of the frame. Chains 24 are respectively secured to opposite ends of the transverse angle 23 and extend forwardly and outwardly, being anchored within the frame at the forward extensions 10. Spaced apart trailing running straps 25 and 26 of semi-rigid flat stock have the forward ends thereof secured in spaced apart relation to the transverse angle 23 and trail in parallel relation at least party in contact with the ground as the accumulator is drawn forwardly. The rear ends of the running straps 25 and 26 are free and terminate near the rear 5 of the frame in contact with the ground.

Guide prongs 27 are secured at one end thereof beneath the horizontal leg of the angle 17 then extend rearwardly toward the interior of the frame 2 in laterally spaced apart relation. The guide prongs 27 are comprised of a hollow tube 28 telescopically receiving a rearwardly extending pointed rod 29 and which is adjustable in length of rearward extension by means of a suitable set screw 30.

A bale guide 31 comprises spaced apart angles 32 extending upwardly from and secured to the respective structural members 3. An axle 33 is rotatably mounted at opposite ends thereof to the upper ends of the angles 32 and extends transversely therebetween spaced above the structural members 3. A depending bar 34 is fixed to and extends downwardly from the axle 33 intermediate the angles 32 and terminates approximately the same height as the horizontal portion of the structural members 3. A link 35 is fixed to the axle 33 and cooperates with a helical tension spring 36 to resiliently urge the depending bar 34 to a downwardly pointed position but permits the bar 34 to move resiliently rearwardly for contacting a bale entering the frame 2 so as to urge the bale into ground parallel position within the frame rather than standing on one end.

Rear upright angles 37 are secured to the rear ends of the structural members 3 and the intermediate bars 9 and are fixed to the skids 6 adjacent the rear thereof. The angles 37 extend upwardly from the horizontal portions of the structural members 3 above the height of two layers of bales in stacked relation as best shown in FIG. 13. A transverse angle 38 is fixed to the upper ends of the angles 37 and extends laterally outwardly therefrom forming wings 39. Structural angles 40 are secured at one end thereof to the wings 39 at positions spaced outwardly from the angles 37 and extend downwardly and inwardly to positions 41 where the angles 40 meet the skids 6, and are there secured. The structural angles 40 add rigidity to the rear 5 of the frame 2 which is entirely open at the rear except for the transverse angle 38 and structure associated with a gate 42.

Mounting ears 43 are fixed to the respective angles 37 at the upper ends thereof and extend rearwardly past the transverse angle 38. A transversely extending shaft 44 is rotatably mounted at opposite ends thereof on the ears 43 and has a pair of rods 45 fixed at one end respectively thereto and normally depending therefrom. A cross bar 46 is fixed to the rods 45 and extends laterally therebeyond at each end so as to assume a length greater than the distance between the rear upright angles 37. A pair of latch members 47 are pivotally mounted for vertical motion on the respective rear upright angles 37 and are adapted to engage and retain the opposite ends 48 of cross bar 46 to normally prevent the cross bar 46 and rods 45 from moving rearwardly and upwardly about the shaft 44. Suitable stops 49 prevent the latch members 47 from dropping below a relatively horizontal position extending rearwardly of the frame 2.

Draw bars 50 are respectively pivotally engaged at one end thereof with the respective latch members 47 and at the other end thereof to links 51 mounted on fixed ears 52 for vertical pivotal motion. The ears 52 are fixed to the rear upright angles 37 near the mounting ears 43 and a shaft 52 rigidly interconnects the links 51 and rotates therewith. Suitable resilient members such as springs 53 urge the links 51 resiliently downwardly, thus causing the latch members 47 to normally maintain a horizontally and rearwardly directed position even when the accumulator is being drawn over rough terrain. A trigger 54 is fixed to the shaft 52 intermediate the ends thereof and projects downwardly and inwardly into the frame 2 at the level of an upper bale 55 resting on a lower bale 56.

Thus, ground contacting bales which have entered the front 4 of the frame 2 are forced to lie flat on the ground by the bar 34 and come to rest against the rear gate 42. The bale 56 (FIG. 13) constitutes the first bale which is drawn along the ground partially supported by the running straps 25 and 26 and urged forwardly by the closed rear gate 42. A second bale designated 57 next comes to rest with respect to the accumulator in end-to-end relation on the ground in contact with the bale 56. The third bale, designated 55, does not touch the ground, but is pushed along the upper surface of the bales 57 and 56 toward the gate by the fourth bale 58. A fifth bale (not shown) moving into the frame 2 causes the fourth bale 58 to urge the third bale 55 against the trigger 54 which results in the latch members 47 rising, permitting the gate 42 to pivot upwardly under the rearward pressure of the bales produced by frictional contact of the bales 56 and 57 with the ground. Four bales are thereby deposited in end-to-end and over-under stacked relation in the field, FIG. 13. Upon passing over the fourth bale 58, the trigger 54 and gate 42 are free to return to the original position illustrated in FIG. 12 until the trigger is again actuated.

In fields which have long ruts, such as irrigation rills, it is possible that one or both of the skids 6 may become so engaged therein that any attempt to slide or skid the frame in a direction other than the direction of the rut will result in the frame tending to turn over. To prevent this, brace members 59 project laterally outwardly of the respective skids 6 (FIG. 1) and have outer ends 60 elevated above the skids 6. Vertically extending axles 61 are respectively rotatably supported on the outer ends 60 and extend downwardly therefrom. Wheel supports 62 are fixed at the lower ends of the axles 61 and rotatably mount suitable wheels 63 offset from axles and normally positioned approximately two inches above the ground. The axles 61, in this example, are rotatably mounted in collars 64 permitting the wheels 63 to trail in any direction about the vertical axles 61. Suitable strengthening bars 65 add rigidity to the wheel supporting structure. Should one or both of the skids 6 drop into a rut or rill, the subsequent lowering of the frame 2 will cause one or both of the wheels 63 to contact the ground thus preventing the respective skid from bottoming into the rut or rill and maintaining the forward extension 10 above the edge of the rut or rill so that lateral motion of the frame 2 will cause the accumulator to easily move out of the depression.

Further protection against trapping of the skids 6 in a rut is provided by laterally extending runners 66 at the rear of the accumulator. Suitable bracing structures 67 supports the respective runner 66 a short distance above the ground, for example a fraction of an inch, whereupon the rear of the accumulator is supported when one or both of the skids 6 drop near the rear portion of the accumulator. The leading end 68 of the respective runners 66 are curved upwardly so as to smoothly ride over small obstructions. An elongated brace 69 joins the runner supporting structure 67 with the wheel supporting structure 59 thus increasing the rigidity of the assembly.

Referring particularly to FIGS. 3 and 4, a modification of this invention is shown wherein structure to draw the accumulator laterally from ruts or rills takes the form of outwardly and angularly upwardly directed rigid elongated lips 70 fixed to the respective skids 6 and extending therealong at least a substantial portion of the length thereof. The lips 70 are suitably secured to the respective skids by means of legs 71 co-extensive therewith and secured against the skids, in this example, by suitable recessed screws 72. Should either of the skids 6 drop into a rut or rill, the lips 70 will tend to catch an edge thereof whereupon the lateral pulling of the apparatus will cause the respective skid to rise up over the edge whereupon the structure will again be supported by the skids. The lips 70 also serve to prevent snagging due to small obstructions when the apparatus is being turned.

In drawing the accumulator structure over deep ditches or depressions, a problem is sometimes presented in that the bales within the frame tend to drop out the open bottom. To prevent this, a bale edge support angle 73 is placed adjacent each upwardly extending leg 74 of the respective skids 6, the ground contacting leg 75 of the skids 6 projecting outwardly of the accumulator frame. The support angle 73 has a vertical leg 76 slidably adjacent the skid leg 74 and extending therealong. The support angles 73 each have an inwardly directed horizontal leg 77 and a front end 78 and rear end 79. The support angles 73 are pivotally secured with respect to the skids 6 at the front ends 78, in this example, by means of a suitable shaft 80 extending transversely therethrough and engaging the respective skids 6. Restraining members 81 are associated with the respective skids and support angles 73 near the rear ends 79 to permit limited vertical pivotal movement of the support angles. The support angle horizontal legs 77 thus provide bale edge supporting surfaces adapted to support bales while the frame passes over depressions in the ground but allow the bales to normally maintain the desired frictional contact with the ground.

One form of restraining member 81 is illustrated in FIG. 6 and comprises a rigid loop 82 secured to the skid 6 and presenting a forwardly open passageway. A rigid finger 83 is fixed with respect to the support angle 73 by means of a brace 84 which is welded to the leg 76 and extends over the leg 74 and downwardly into alignment with the rigid loop 82. The rigid finger 83 is trapped within the loop 82 permitting the respective support angle 73 to freely move upwardly and downwardly within the predetermined limits with respect to the skid 6 but stop such movement beyond the predetermined limits. Thus, a bale can be maintained in contact with the ground during normal operation and yet be supported within the accumulator frame if the accumulator should bridge over a relatively large depression in the field.

Another form of restraining member is shown in FIG. 7 and comprises a brace 85 similar to the brace 84 of FIG. 6 but anchoring one end of a chain 86. The other end of the chain 86 is anchored at 87 to the skid 6. In this form of restraining member, the horizontal leg 77 normally receives the corner 88 (FIG. 7) of a bale 89 therein and the support angle is free to move upwardly to the limit position illustrated by the broken lines 90 whereupon the chain 86 becomes taut and further upward movement is restricted. In the event that the skid bridges over a large depression the bale is permitted to drop to a point where the horizontal leg 77 reaches the position indicated by the broken lines 91, but further downward movement is prevented by the top 92 of the skid leg 74 contacting the horizontal underside of the brace 85, thus supporting the bale 89 against dropping out of the accumulator.

Referring to FIGS. 8 and 9 there is illustrated a bale accumulator and stacker particularly adapted for use on steeply sloping terrain where a normal bale stack would tend to fall over down-hill when the long side of the bales are transverse to the line of slope. In this modification the horizontal portion of the side bars or members 3 are spaced apart a greater distance than the distance between the intermediate bars 9 and skids 6. An elongated tube 93 is telescoped over each of the upper bars or members 3 and is rotatable thereon. Downwardly projecting braces 94 are fixed to the respective tubes 93 and have lower ends secured to respective parallel elongated longitudinally extending push rails 95.

The push rails 95 are located at the upper bale level, that is, above the height of a bale lying flat on the ground and less than the height of one bale on another, for movement laterally within the frame 2 upon selective rotation of the respective tubes 93. The forward ends 96 of the push rails 95 are curved outwardly to present a funnel configuration therebetween for receiving bales entering the frame 2 at the front 4. Upwardly extending standards 97 are fixed to the tubes 93 and have suitable weights 98 thereon spaced upwardly from the tubes 93. A tie rod 99 is pivotally connected at opposite ends thereof to the respective standards 97 whereby the tubes 93 must rotate simultaneously in the same direction. Stop bars 100 extend between the upper bars or members 3 and the respective intermediate bars 9. The stop bars 100 are adapted to engage the respective push rails 95 to limit the horizontal movement thereof to an arc which permits the selective extension of a push rail into the frame 2 a few inches while the opposite push rail is withdrawn an equal amount therefrom.

In use, the accumulator is drawn across a sloping field transversely to the direction of slope, the weights 98 tend to move down-hill, thus causing the push rail 95 associated with the down-hill weight to enter several inches into the accumulator frame. The first layer 101 of bales enters the accumulator frame in the normal manner and is pushed longitudinally within the frame on the ground through pressure applied by the rear gate. The second layer 102 of bales, however, is forced to a laterally offset position with respect to the first layer 101 through contact with the inwardly projecting push rail, FIG. 9. Thus, when the rear gate is tripped and the stack is left in the field, the second layer 102 of bales will be offset uphill on the first layer 101 whereupon the center of gravity of the stack is shifted substantially toward a central vertical line 103 rather than a central normal line 104 extending at right angles to the slope 105.

On unusually rough terrain a problem is sometimes presented by the fifth bale dropping prematurely and exiting from the accumulator before the gate 42 has a chance to swing to its closed position. In order to further retard this bale a modified flexible hitch construction is used such as illustrated in FIGS. 10 and 11. A pair of upwardly projecting standards 106 are secured to the frame rearwardly of the transverse angle 17 and have a retainer bar 107 fixed thereto and spaced above the frame. A pair of flexible chains 108 are secured in spaced apart relation to the retainer bar 107 between the standards 106 and extend forwardly to the rear face 15 of the baler forming an upper closure for the flexible chain hitch 12. The guide prongs 27, retainer bar 107 and chains 108 are so spaced with respect to each other that a bale 109 (FIG. 11) entering the frame 2 is retained in tilted condition therebetween retarding its drop into the accumulator. The subsequent bale 111 from the chute 16 eventually pushes the bale 109 into the accumulator, however, the delay is sufficient to allow time for the rear gate to close and lock before the bale 109 comes in contact therewith.

Although certain forms of this invention have been illustrated and described it is not to be limited thereto except insofar as such limitations are included in the following claims.

What is claimed and desired to be secured by Letters Patent is:

1. A bale accumulator and stacker comprising:
   (a) an elongated frame having a bale receiving front end and a gate supporting rear end and upwardly extending sides spaced apart to receive bales therebetween in frictional contact with the ground,
   (b) hitch means on said front end for attachment to a rear delivery hay baler,
   (c) said frame including a pair of elongated longitudinally extending spaced apart ground contacting skids slidably supporting said frame on the ground,
   (d) a bale edge support member adjacent and extending along each of said skids and having an inwardly directed horizontal leg, and restraining means operable between said frame and support members and permitting limited vertical movement of said support members with respect to said skids,
   (e) whereby said support members horizontal legs provide bale edge supporting surfaces adapted to support bales when said frame passes over depressions, but allow the said bales to normally maintain frictional contact with the ground.

2. The structure as set forth in claim 1 wherein:
   (a) said bale edge support members are elongated angles each having a vertical leg positioned outwardly of and extending above said horizontal leg.

3. The structure as set forth in claim 1 wherein:
   (a) said support members have front ends pivotally secured for vertical motion to said skids, and restraining means comprises a rigid member fixed to each of said support members and projecting over the respective adjacent skids rearwardly of said support member front ends,
   (b) retaining means mounted on said respective skids, and means associated with said respective rigid members and loosely engageable with said retaining means to permit said limited vertical movement.

4. The structure as set forth in claim 3 wherein:
   (a) said retaining means comprises a rigid loop and said means associated with said rigid members comprises a rigid finger fixed to and projecting from the rigid member loosely into the respective loop.

5. The structure as set forth in claim 3 wherein:
   (a) said retaining means and said means associated with said rigid members together comprise a chain.

6. A bale accumulator and stacker adapted for use on sloping ground comprising:
   (a) an elongated frame having a bale receiving front end and a gate supporting rear end and upwardly extending sides spaced apart to receive upper and lower layers of bales therebetween,
   (b) said sides respectively including bars spaced apart at said lower layer level and limiting the lateral displacement of lower level bales with respect to said frame,
   (c) support means movably mounted on said frame and having spaced apart brace means thereon and movable transversely of said frame upon movement of said support means, elongated longitudinally extending push rails mounted on said brace means and located at said upper level, said push rails being spaced apart to receive upper layer bales therebetween and adapted to move transversely with said brace means for displacing upper level bales laterally with respect to lower level bales, and
   (d) means associated with said support means for moving said brace means laterally upwardly in response to sloping said frame laterally, whereby upper layer bales are shifted to a position upwardly laterally offset from lower layer bales in said frame.

7. The structure as set forth in claim 6 wherein:
   (a) said frame includes bars at said upper level spaced apart a distance greater than said lower level bars, and
   (b) said support means comprises an elongated tube telescoped over each of said upper level bars and rotatable thereon, said brace means are fixed to said respective tubes and project downwardly therefrom,
   (c) said means associated with saids support means comprising upwardly extending standards fixed to said tubes and having at least one weight thereon spaced upwardly from said tubes and a tie-rod pivotally connected to said standard whereby said tubes rotate simultaneously in the same direction.

8. A bale accumulator and stacker comprising:
   (a) an elongated frame having a bale receiving front end and upwardly extending sides spaced apart to receive bales therebetween, flexible hitch means on said front end for attachment to a rear delivery hay baler, said hitch means including flexible side members and flexible bottom members, rigid bale supporting guide means secured to said frame above the ground and extending rearwardly into said frame from said front end,
   (b) a pair of standards secured to said frame, and transverse retainer bar fixed to said standards rearwardly of said front end and spaced above said guide means,
   (c) said guide means and retainer bar being vertically spaced with respect to each other a distance sufficient to retain a bale in tilted condition therebetween to slow the drop of said last named bale into said frame.

9. The structure as set forth in claim 8 including:
   (a) at least one flexible member secured to said retainer bar and extending forwardly for anchoring to said baler, said last named member forming an upper closure for said hitch means.

10. A bale accumulator and stacker comprising:
    (a) an elongated frame having a bale receiving front end and a gate supporting rear end and upwardly extending sides spaced apart to receive bales therebetween,
    (b) hitch means on said front end for attachment to a rear delivery hay baler,
    (c) said frame including a pair of elongated longitudinally extending spaced apart ground contacting skids normally slidably supporting said frame on the ground, and
    (d) support means mounted on said frame and projecting laterally outwardly of said respective skids, said support means having members spaced lateral-outwardly of said skids at said front and rear ends, said members being normally spaced above the ground and adapted to movably support said skids, said members at said front end comprising wheels pivotally mounted on an offset vertical axis for steering in the direction of front end pull.

11. The structure as set forth in claim 10 wherein:
    (a) said members at said rear end are runners.

12. The structure as set forth in claim 10 wherein the respective skids includes:
    (a) outwardly and angularly upwardly directed rigid lips fixed thereto at ground level and extending there along at least a substantial portion of the length thereof, said lips tending to cause said frame to raise up out of a rut and aid in preventing snagging during turns.

References Cited

UNITED STATES PATENTS

| | | | |
|---|---|---|---|
| 2,689,055 | 9/1954 | Kizer et al. | 214—353 X |
| 2,800,746 | 7/1957 | Harmon | 280—8 X |
| 2,948,543 | 8/1960 | Collier | 280—8 |
| 3,308,971 | 3/1967 | Sinden et al. | 214—353 X |

FOREIGN PATENTS 732,088  6/1955  Great Britain.

ALBERT J. MAKAY, *Primary Examiner.*

U.S. Cl. X.R.

56—475; 214—6, 518; 280—8